United States Patent [19]

Yanai et al.

[11] Patent Number: 4,661,418
[45] Date of Patent: Apr. 28, 1987

[54] MAGNETIC RECORDING MEDIUM

[75] Inventors: Akio Yanai; Ryuji Shirahata, both of Tokyo, Japan

[73] Assignee: Fuji Photo Film Co., Ltd., Kanagawa, Japan

[21] Appl. No.: 439,169

[22] Filed: Nov. 4, 1982

[30] Foreign Application Priority Data

Nov. 12, 1981 [JP] Japan .................................. 56-181480

[51] Int. Cl.$^4$ ............................................. H01F 10/02
[52] U.S. Cl. .................................... 428/610; 428/336; 428/611; 428/637; 428/639; 428/693; 428/702; 428/900; 428/928
[58] Field of Search ............... 428/694, 900, 610, 611, 428/637, 639, 928, 336, 693, 702; 427/127-132, 48

[56] References Cited

U.S. PATENT DOCUMENTS 4,239,835 12/1980 Iijima et al. ..................... 427/132 X Primary Examiner—Bernard D. Pianalto
Attorney, Agent, or Firm—Sughrue, Mion, Zinn, Macpeak and Seas

[57] ABSTRACT

A magnetic recording medium comprising a magnetic recording layer formed on a non-magnetic substrate by depositing a ferromagnetic metal or alloy on the substrate, the recording layer containing oxygen atoms in such a manner that the ratio thereof gradually reduces from the substrate side to the surface of the recording layer except the portion thereof very near to the surface thereof. The recording layer may comprise many deposited magnetic films, each containing oxygen atoms distributed as described above or uniformly in a ratio different from those in the other magnetic films. In the latter case, a magnetic film positioned nearer to the substrate contains a higher ratio of oxygen atoms.

11 Claims, 7 Drawing Figures

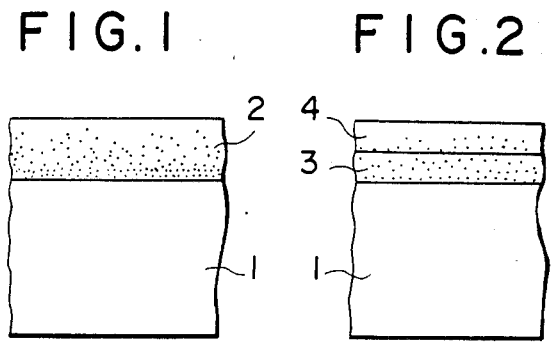
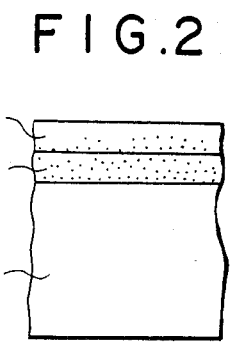
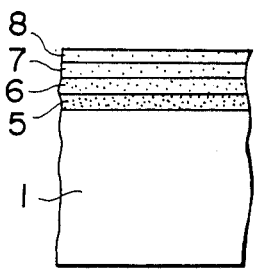
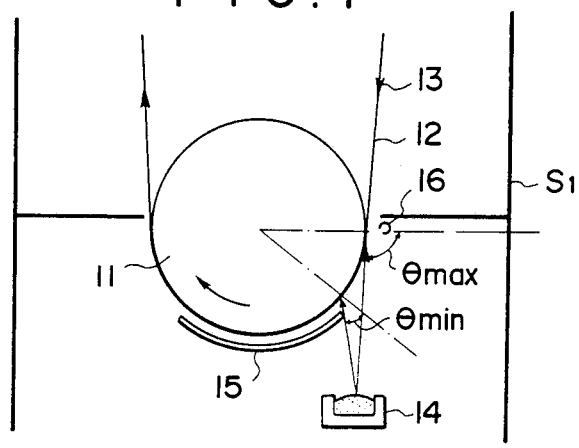
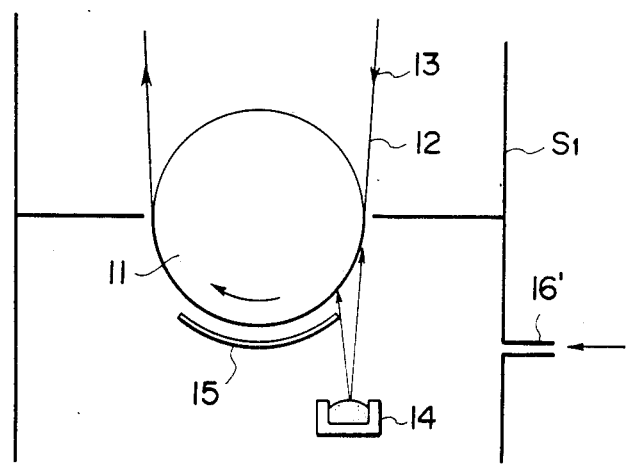

MAGNETIC RECORDING MEDIUM

BACKGROUND OF THE INVENTION

1. Field of the Invention

This invention relates to a magnetic recording medium comprising a thin ferromagnetic metal film recording layer provided on a substrate, and more particularly to a magnetic recording medium exhibiting excellent durability and good adhesion between the thin ferromagnetic metal film and the substrate.

2. Description of the Prior Art

Coating type magnetic recording media are widely used. These magnetic recording media are made by dispersing magnetic particles in a binder, applying the obtained dispersion on substrates, and drying this dispersion. In the magnetic recording media of this type, it is impossible to eliminate the use of the binder and there is a limit in minimizing the thickness of the recording media in order to conduct high-density recording.

Recently, so-called non-binder type magnetic recording media using no binders have attracted attention because of their ability to meet strong demand for high density recording. The magnetic recording media of this type have magnetic recording layers which consist of thin ferromagnetic metal films formed by a vapor deposition process such as vacuum deposition, or a plating process such as electroplating or electroless plating. Thus various efforts are being made to develop non-binder type magnetic recording media suitable for practical use.

Particularly, the vacuum deposition process is advantageous in that it requires no waste water treatment unlike the plating process, the process for preparing the recording media is simple, and the film deposition speed is higher than any other processes.

When a magnetic tape comprising a thin ferromagnetic film recording layer formed by vacuum deposition is compared with the conventional coating type magnetic tape, the former exhibits an extremely higher reproduction output and the reproduction output frequency characteristics greatly extending towards the short wavelength side. In order to obtain good magnetic characteristics of the magnetic tape prepared by the vacuum deposition process, it has been proposed to conduct deposition while oxygen is introduced into the vacuum vessel. However, this proposed method is not completely satisfactory with respect to the durability of the magnetic tape obtained and the adhesion between the thin ferromagnetic film and the substrate therefor.

SUMMARY OF THE INVENTION

The primary object of the present invention is to provide an improved magnetic recording medium comprising at least one thin ferromagnetic film provided on a substrate by vacuum deposition.

Another object of the present invention is to provide a magnetic recording medium exhibiting a higher reproduction output than that of a coating type magnetic tape.

The specific object of the present invention is to provide a magnetic recording medium exhibiting good durability and excellent adhesion between the thin ferromagnetic film recording layer and the substrate therefor.

The magnetic recording medium in accordance with the present invention comprises a thin ferromagnetic metal film recording layer deposited on a substrate in a vacuum, said recording layer containing oxygen atoms together with ferromagnetic metal atoms in such a manner that the ratio of the oxygen atoms reduces in the depth direction of the recording layer from the substrate side to the surface of the recording layer except the portion very near to the surface thereof. The magnetic recording medium in accordance with the present invention exhibits a sufficiently high reproduction output and magnetic characteristics in the short wavelength region far overwhelming those of the conventional coating type magnetic tape. Further, the magnetic recording medium exhibits good durability and adhesion between the recording layer and the substrate.

In the present invention, the ratio of oxygen atoms to magnetic metal atoms in the vicinity of the substrate is in the range between 10% to 40%, preferably between 15% and 25%, and that in the vicinity of the surface of the recording layer (except the portion at several tens of angstroms from the surface thereof) is in the range between 5% and 20%, preferably between 5% and 15%. It is assumed that the magnetic recording medium in accordance with the present invention exhibits improved durability and adhesion between the recording layer and the substrate, while the reproduction output is maintained high, because the recording layer have the configuration as described above and the residual magnetic flux density contributing to the reproduction output increases towards the surface of the recording layer, which is positioned near to a magnetic head during the magnetic recording and reproducing. In the portion of the recording layer very near to the surface thereof (the portion at several angstromes from the surface thereof), adsorption of oxygen molecules occurs inevitably due to contact of the surface with ambient air, resulting in the formation of a layer rich in oxygen atoms. However, the thickness of this layer rich in oxygen atoms is generally several tens of angstromes and does not adversely affect the recording and reproducing steps.

Further, the magnetic recording medium in accordance with the present invention exhibits a wear resistance and running stability improved over those of the conventional thin metal film type magnetic tape to a level comparing favorably with the conventional coating type magnetic tape.

The magnetic metal deposition material used in the present invention may be a metal such as Fe, Co or Ni, or an alloy such as Fe—Co, Fe—Ni, Co—Ni, Fe—Co—Ni, Fe—Rh, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Cr, Co—Cr, Ni—Cr, Fe—Co—Cr, Ni—Co—Cr or Fe—Co—Ni—Cr. An alloy containing 60% by weight or more of Co, or an alloy containing 60% by weight or more of Co and 2% by weight or more of Ni is particularly preferable.

In the present invention, the recording layer of the magnetic recording medium may comprise a single thin magnetic film or two or more films stacked one upon another. It is also possible to position a non-magnetic layer between the substrate and the recording layer and/or between the thin magnetic films in the recording layer.

The oxygen distribution in the thickness direction of the recording layer may be changed continuously or stepwise. Therefore, when the recording layer comprises a plurality of thin magnetic films, the first film nearest to the substrate may contain the maximum content of oxygen, and the oxygen content may be decreased sequentially in the films positioned farther from the substrate.

BRIEF DESCRIPTION OF THE DRAWINGS

FIGS. 1 to 3 are schematic views showing various embodiments of the magnetic recording medium in accordance with the present invention, FIGS. 4 and 5 are schematic views showing deposition apparatus for preparing a magnetic tape provided with a thin ferromagnetic film containing oxygen.

DESCRIPTION OF THE PREFERRED EMBODIMENTS

Figure 6:
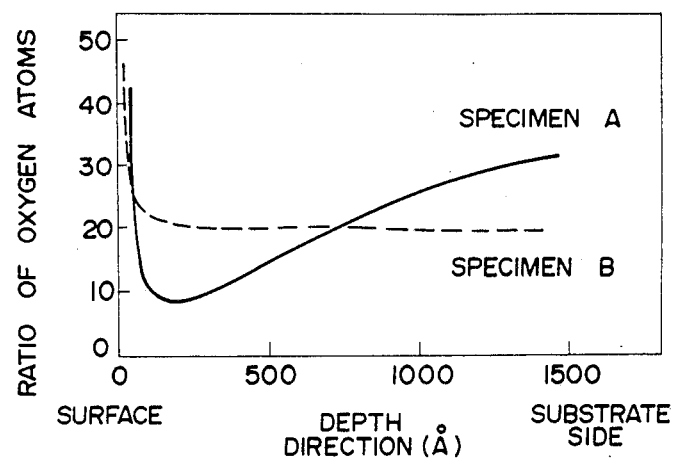
FIG. 6 is a graph showing a change in the ratio of oxygen atoms in the depth direction of the magnetic recording media described in Example 1.

The present invention will hereinbelow be described in further detail with reference to the accompanying drawings.

FIG. 1 shows an embodiment of the magnetic recording medium in accordance with the present invention, in which a single thin magnetic film 2 is formed on a nonmagnetic substrate 1. In the thin magnetic film 2, oxygen atoms are distributed so that the ratio thereof continuously decreases in the direction from the vicinity of the substrate 1 to the upper surface of the magnetic film 2.

FIG. 2 shows another embodiment of the magnetic recording medium in accordance with the present invention, in which the magnetic recording layer comprises thin magnetic films 3 and 4. In the respective thin magnetic films 3 and 4, oxygen atoms are distributed so that the ratio thereof continuously decreases from the side nearer to the substrate 1 to the side farther therefrom.

FIG. 3 shows a further embodiment of the magnetic recording medium in accordance with the present invention, in which the magnetic recording layer comprises thin magnetic films 5 to 8 stacked on the substrate 1. In thin magnetic films 5 to 8, oxygen atoms are approximately uniformly distributed in each film, but the content thereof differs among the films. Namely, the content of oxygen atoms is the largest in the thin magnetic film 5 positioned nearest to the substrate 1 and is descreased sequentially in the thin magnetic films 6 to 8 positioned farther from the substrate 1.

The thickness of the recording layer, i.e. the thickness of the thin magnetic film 2 or the total thickness of thin magnetic films 3 and 4 or 5 to 8, is generally selected within the range of between about 0.02 $\mu$m and 5.0 $\mu$m, preferably between 0.05 $\mu$m and 2.0 $\mu$m, to provide a sufficient electromagnetic output and allow high density recording. When the recording layer is comprised of two or more thin magnetic films, the thin magnetic films may have a thickness equal to one another, or the thin magnetic film or films other than that nearest to the substrate may have a thickness within the range of between the thickness of the film nearest to the substrate plus and minus 50%.

The deposition process conducted in the present invention embraces not only the ordinary vacuum deposition process as described in U.S. Pat. No. 3,342,632 but also the processes of forming a thin film on a substrate under a condition, in which the mean free path of evaporated molecules is large, by ionizing or accelerating the vapor flow by use of an electric field, a magnetic field or an electron beam, e.g. the electric field deposition process as described in Japanese Unexamined Patent Publication No. 51(1976)-149008, or the ionizing deposition process as disclosed in Japanese Patent Publication Nos. 43(1968)-11545, 46(1971)-20484, 47(1972)-26579, and 49(1974)-45439, or Japanese Unexamined Patent Publication Nos. 49(1974)-33890, 49(1974)-34483 and 49(1974)-54235. The oblique incidence deposition process as disclosed, for example, in U.S. Pat. No. 3,342,632 is particularly preferable.

Oxygen may be contained in the thin magnetic film or films of the magnetic recording medium in accordance with the present invention by use of a known method in which a magnetic metal or an alloy is evaporated in an oxygen atmosphere and caused to deposit on a nonmagnetic substrate.

In order to continuously change the content of oxygen in the thickness direction of the recording layer, it is possible to employ the method as disclosed in Japanese Patent Application No. 56(1981)-139095.

The present invention is further illustrated by the following nonlimitative examples.

EXAMPLE 1

Magnetic tapes were prepared by forming a thin magnetic cobalt film on a 15 $\mu$m-thick polyethylene terephthalate film in a winding type deposition apparatus as shown in FIGS. 4 and 5. In FIGS. 4 and 5, a tape-like substrate 12 was moved in the direction of the arrow 13 along a cylindrical cooling can 11 positioned in a vacuum vessel S1 which is only partially shown. A hearth 14 containing a magnetic deposition material was positioned below the cylindrical cooling can 11, and a flow of vapor of the magnetic deposition material was obliquely deposited on the moving substrate 12 via a mask 15. Deposition was conducted while the incident angle of the vapor flow with repsect to the substrate 12 continuously changed from $\theta$ max to $\theta$ min as the substrate 12 moved along the cooling can 11. An oxidizing gas was introduced from an oxidizing gas introducing section 16 positioned in the vicinity of the $\theta$ max portion of the vapor flow in FIG. 4, and from an oxidizing gas introducing section 16' positioned at the wall of the vacuum vessel S1 in FIG. 5.

The hearth 14 was the electron beam heating type, and the oxygen partial pressure was set to $1 \times 10^{-4}$ Torr during deposition. Each magnetic film obtained has a thickness of 1500 Å and a coercive force of 900 Oe. The composition of the magnetic films, as determined by the Auger spectroscopy, was as shown in FIG. 6, in which specimen A was the magnetic tape prepared by use of the apparatus shown in FIG. 4 and specimen B was the magnetic tape prepared by use of the apparatus shown in FIG. 5. In FIG. 6, the increases in oxygen content in the vicinity of the surfaces of the magnetic films of specimens A and B were attributable to adsorption of oxygen contained in ambient air to the surfaces of the magnetic films. Adhesion between the magnetic films and the substrates, durability and electromagnetic transducing characteristics of the magnetic tapes obtained were determined by use of a VHS system video tape recorder. The results were as shown in Table 1 below, in which the reproduction output was evaluated with that of the coating type magnetic tape taken as 0 dB.

TABLE 1

|  | Reproduction output | | Adhesion | Still durability |
|---|---|---|---|---|
|  | 4 MHz | 6 MHz | | |
| Specimen A | 16.9 | 19.0 | ○ Good | 30 minutes or more |
| Specimen B | 14.3 | 15.5 | X Bad | 10 minutes |

Adhesion between the magnetic films and the substrates was determined by peel tests using adhesive cellophane tapes.

EXAMPLE 2

Figure 7:
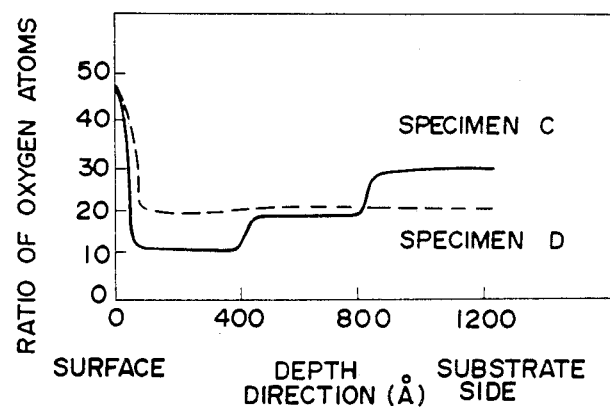
FIG. 7 is a graph showing a change in the ratio of oxygen atoms in the depth direction of the magnetic recording media described in Example 2.

Magnetic tape specimens C and D were prepared by forming three cobalt-nickel films (Ni: 20% by weight) having a total thickness of 1200 Å on substrates in the apparatus shown in FIG. 5. In the preparation of specimen C, the first film, the second film and the third film, counting from the substrate side, were deposited at oxygen partial pressures of $1.4 \times 10^{-4}$ Torr, $1.2 \times 10^{-4}$ Torr, and $1.0 \times 10^{-4}$ Torr, respectively. In the preparation of specimen D, the first to third films were deposited at an oxygen partial pressure of $1.2 \times 10^{-4}$ Torr. The oxygen distributions in the thickness direction of the films, as determined by the Auger analysis, were as shown in FIG. 7. In FIG. 7, the increased oxygen contents in the vicinity of the surfaces of the recording layers respectively comprising the three magnetic films in specimens C and D were attributable to adsorption of oxygen contained in ambient air to the surfaces.

TABLE 2

|  | Reproduction output | | Still durability |
|---|---|---|---|
|  | 4 MHz | 6 MHz | |
| Specimen C | 16.0 | 20.2 | 30 minutes or more |
| Specimen D | 14.0 | 17.4 | 12 minutes |

The electromagnetic transducing characteristics of specimens D and D, as determined by use of a VHS system video tape recorder, were as shown in Table 2. Further, adhesion tests conducted in the same way as in Example 1 revealed that specimen C exhibited better adhesion than specimen D.

We claim:

1. A magnetic recording medium comprising a magnetic recording layer formed on a non-magnetic substrate by depositing a ferromagnetic metal or a ferromagnetic alloy on the substrate, said recording layer containing oxygen atoms in such a manner that the ratio of the oxygen atoms to magnetic metal atoms gradually reduces in the direction from the substrate side to the surface of the recording layer except the portion thereof very near to the surface thereof.

2. A magnetic recording medium as defined in claim 1 wherein said recording layer is formed by an oblique incidence deposition process.

3. A magnetic recording medium as defined in claim 1 wherein said recording layer is constituted mainly by cobalt, nickel and oxygen.

4. A magnetic recording medium as defined in claim 1 wherein said recording layer is constituted mainly by cobalt and oxygen.

5. A magnetic recording medium as defined in claim 1 wherein said recording layer comprises a plurality of deposited magnetic films.

6. A magnetic recording medium as defined in claim 5 wherein each deposited magnetic film contains oxygen atoms in such a manner that the ratio of the oxygen atoms gradually reduces in the direction from the side nearer to the substrate to the side farther from the substrate.

7. A magnetic recording medium as defined in claim 5 wherein oxygen atoms are approximately uniformly distributed in each deposited magnetic film, and a deposited magnetic film positioned nearer to the substrate contains a higher content of oxygen atoms.

8. A magnetic recording medium as defined in claim 1 wherein the ratio of oxygen atoms to magnetic metal atoms in the vicinity of the substrate is in the range between 10% and 40%, and the ratio in the vicinity of the surface of said recording layer except the portion thereof very near to the surface thereof is in the range between 5% and 20%.

9. A magnetic recording medium as defined in claim 8 wherein said ratio in the vicinity of the substrate is in the range between 15% and 25%, and said ratio in the vicinity of the surface of said recording layer except the portion thereof very near to the surface thereof is in the range between 5% and 15%.

10. A magnetic recording medium as defined in claim 1 wherein said recording layer has a thickness within the range between about 0.02 μm and 5.0 μm.

11. A magnetic recording medium as defined in claim 10 wherein said recording layer has a thickness within the range between about 0.05 μm and 2.0 μm.

* * * * *